United States Patent [19]
Siemer

[11] Patent Number: 5,825,008
[45] Date of Patent: Oct. 20, 1998

[54] APPARATUS AND METHOD FOR SETTING RADIAL BAR CODE DISC SENSOR GAIN IN A PHTOGRAPHIC CAMERA

[75] Inventor: John Robert Siemer, Rochester, N.Y.

[73] Assignee: Eastman Kodak Company, Rochester, N.Y.

[21] Appl. No.: 613,398

[22] Filed: Mar. 8, 1996

[51] Int. Cl.⁶ .................................................. G06K 7/10
[52] U.S. Cl. .......................................... 235/462; 235/464
[58] Field of Search .................................. 235/462, 436, 235/472, 494, 487, 454, 464; 348/362, 255; 354/402, 412, 289.1, 289.12

[56] References Cited

U.S. PATENT DOCUMENTS

| | | | |
|---|---|---|---|
| 4,721,849 | 1/1988 | Davis et al. | 235/455 |
| 4,825,058 | 4/1989 | Poland | 235/472 |
| 4,841,132 | 6/1989 | Kajitani et al. | 235/472 |
| 4,866,257 | 9/1989 | Elliot et al. | 235/462 |
| 4,868,375 | 9/1989 | Blanford | 235/462 |
| 4,933,538 | 6/1990 | Heiman et al. | 235/462 |
| 4,970,379 | 11/1990 | Danstrom . | |
| 4,999,661 | 3/1991 | Ueno et al. | 354/402 |
| 5,107,140 | 4/1992 | Sherman | 307/358 |
| 5,120,943 | 6/1992 | Benz | 235/375 |
| 5,149,948 | 9/1992 | Chisholm | 235/462 |
| 5,168,148 | 12/1992 | Giebel | 235/462 |
| 5,200,597 | 4/1993 | Eastman et al. | 235/455 |
| 5,250,791 | 10/1993 | Heiman et al. | 235/472 |
| 5,288,983 | 2/1994 | Nakazawa . | |
| 5,321,455 | 6/1994 | Cocca . | |
| 5,350,908 | 9/1994 | Bechtel | 235/462 |
| 5,469,291 | 11/1995 | Plesko | 235/467 |
| 5,481,331 | 1/1996 | Cocca et al. . | |
| 5,488,223 | 1/1996 | Austin et al. | 235/375 |
| 5,497,213 | 3/1996 | Yoshida et al. . | |

FOREIGN PATENT DOCUMENTS

WO 96/13794  5/1996  WIPO .

OTHER PUBLICATIONS

Patent abstract of Japan; vol. 018, No. 439 (P–1787), 16 Aug. 1994 & JP 06 138542 A (Fuji Photo Film Co. Ltd), 20 May 1994.

Primary Examiner—Donald T. Hajec
Assistant Examiner—Thien Minh Le
Attorney, Agent, or Firm—Francis H. Boos, Jr.

[57] ABSTRACT

A photographic film camera adapted to receive a film cassette having a rotatable radial bar code data disk mounted at one end thereof is provided with a variable gain opto-sensor circuit responsive to the radial bar code for generating a sensor output signal having transitions through a logic threshold normally representative of transitions between data elements on the data disk. A microcontroller adapted to read the data from the data disk compensates for a noisy, corrupted by establishing a first gain setting and selectable other gain settings at the opto-sensor circuit during generation of the sensor output signal, and by counting logic threshold transitions in the output signal such that if the transition count for the first gain setting is other than a count corresponding to a fixed number of bar code data elements on the data disk, the opto-sensor gain is adjusted to one or more of the selectable other gain settings until the transition count corresponds to the fixed number of bar code data elements.

9 Claims, 6 Drawing Sheets

APPARATUS AND METHOD FOR SETTING RADIAL BAR CODE DISC SENSOR GAIN IN A PHTOGRAPHIC CAMERA

FIELD OF THE INVENTION

The invention relates to apparatus for setting the gain of a sensor circuit used to read radial bar codes on a data disk in a photographic camera.

BACKGROUND OF THE INVENTION

Commonly assigned U.S. Pat. No. 5,321,455—Cocca discloses a photographic film cassette having a radial bar coded data disk at one end of the cassette. The radial bar code represents information concerning the film in the cassette such as ISO film speed, film type and exposure length. An opto-sensor, comprising a fixed light source and a photodetector is mounted in the cassette receiving chamber of a camera to read the bar code by sensing the transitions between light and dark elements of the bar coded disk as the disk rotates during film loading and film rewind operations. The signal quality from the photodetector must be of good integrity in order to enable proper decoding in the camera of the film information represented by the bar code. Sensing logic in the microcontroller must make decisions in reliance on detected binary signal levels which, in turn, are dependent on the amount of light reflected from the data disk. Due to the nature of this system of capturing the coded information, noise can occur in the output signal from the photodetector for a variety of reasons, such as data disk surface anomalies (dirt, scratches, high or low reflectivity), misalignment of the disk surface with respect to angle or spacing of the disk being too far or too near to the photodetector.

Commonly assigned U.S. Pat. No. 5,481,331 discloses a variable gain opto-sensor system in a camera in which signal gains of different opto-sensors in the camera are calibrated during camera manufacture to compensate for such things as component tolerance variations and other manufacturing variable that adversely affect the quality of the output signal. Gain settings determined during this manufacturing calibration process are stored in camera memory and selectively called up for each associated photodetecting circuit operation during normal camera use. While effective to compensate for inherent system variables, the calibration settings for each photodetecting circuit, once determined, are fixed and are not able to compensate for noise effects in the data disk signal introduced by conditions, such as described above, that are encountered during normal operating usage of the camera. There is a need, therefore, for a simple and fast adjustment of the sensed data disk signal that will compensate for these conditions when they are encountered during sensing of the data disk encoded information.

SUMMARY OF THE INVENTION

In accordance with the invention, there is provided a method of setting gain of a radial bar code opto-sensor in a photographic camera, the radial bar code being on a rotatable data disk mounted in a film cassette inserted into the camera and comprising an extended reference segment and a data segment, the data segment having a fixed number of variable width bar code data elements. The method comprises the steps of initiating rotation of the data disk in the camera and activating the opto-sensor at a first gain setting to generate an output signal representing transitions between said bar code data elements in the data segment. The number of transitions detected in the data segment are counted, and, if the transition count is other than a count corresponding to the fixed number of bar code data elements, iteratively adjusting the opto-sensor gain one or more times to other gain settings and counting the transitions for each gain setting until the transition count corresponds to the fixed number of bar code data elements.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
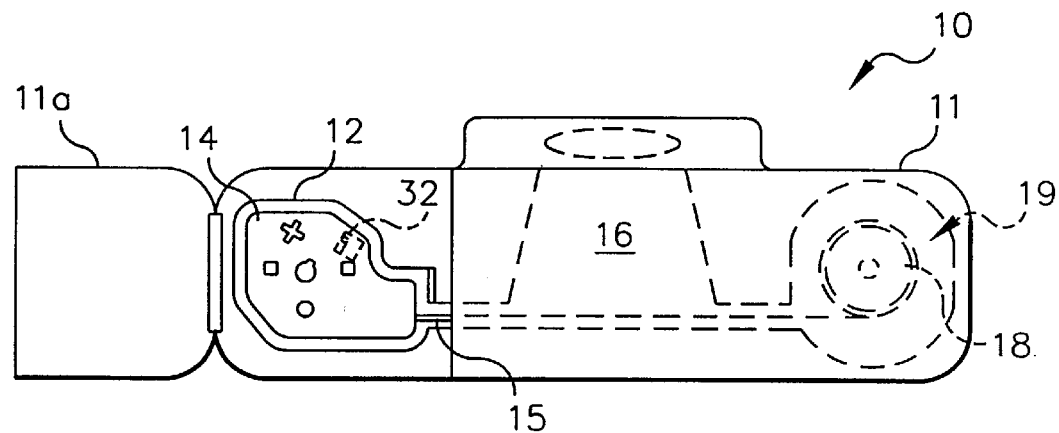
FIG. 1 is a illustration of a camera in which the invention is useful.
Figure 2:
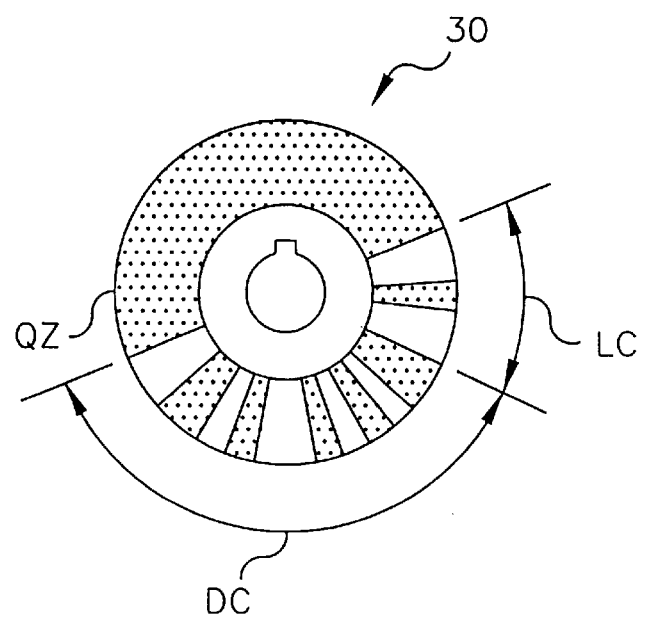
FIG. 2 is an example of a radial bar coded data disk incorporated in a photographic film cassette used in the camera of FIG. 1.
Figure 3:
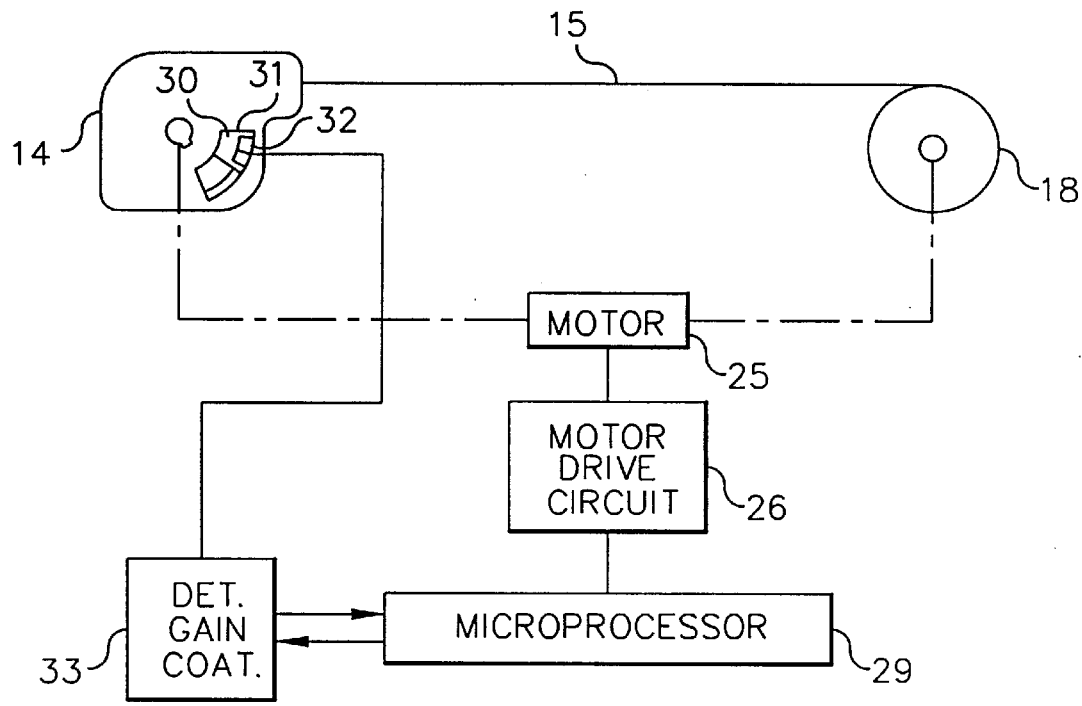
FIG. 3 is a block diagram of a data disk read system embodying the present invention.

Referring to FIGS. 1–3, there is shown a camera 10 of the type adapted for use with a photographic film cassette 14 having a rotatable radial bar coded data disk 30 mounted in partially enclosed manner at one end of the cassette and visible through a window 31 in the end cap of the cassette. The camera 10 comprises a body 11 having a hinged door 11a which provides access to a cassette receiving chamber 12. During the film loading process, the cassette 30 is inserted into the chamber and the cassette film spool is driven in a film unwinding direction by a drive motor 25 to thrust the film 15 out of cassette past the exposure frame 16 to a film takeup chamber 19 where it is engaged by a takeup spool 18. The takeup spool is driven by motor 25 to thereafter withdraw the film from the cassette, frame by frame, during the picture taking process. Microprocessor 29 and motor drive circuit 16 control the driving action of the motor 25. When the film is fully exposed, the motor 25 is activated in reverse rotation, under the control of microprocessor 29 and motor drive circuit 26, to cause the spool of cassette 14 to rewind the film into the cassette.

As seen in FIG. 3, the film cassette 14 includes a data disk 30 mounted on the film spool of the cassette and rotatable therewith. The data disk, shown in FIG. 2, has a radial bar code imprinted on the face of the disk which comprises an extended width reference segment or "quiet zone", QZ and a data segment comprising an interleaved 2-of-5 bar code section, DC, and a three element custom code section LC. As is well known in the bar code art, an interleaved 2-of-5 bar code is comprised of alternating light and dark elements in which the light elements represent one 2-of-5 code and the dark elements represent another 2-of-5 code. For each code, two of the five elements are of one width (e.g. wide) and the remaining three elements are of a different width (e.g. narrow). While the location of the transitions between elements varies depending on the value presented by the code, the total number, ten, of the elements is fixed and, correspondingly, the total number of transitions. In addition to the 2-of-5 section, DC, the data disk further includes a custom three element section, LC. In the photographic system for which this data disk is intended to be used, the 2-of-5 section, DC, contains the ISO speed number and the film type information, while the custom code section, LC, contains the film length information (i.e. in number of exposures). Irrespective of the specific information represented by the particular encodement on the disk, the number of elements and therefore the number of transitions is the same for all data disks.

Figure 4:
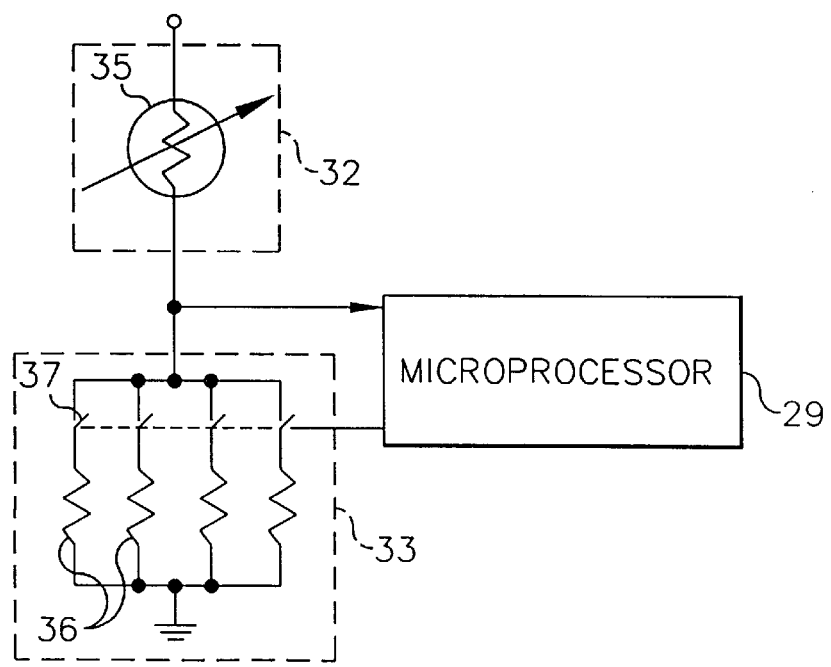
FIG. 4 is a schematic illustration of variable gain controlled data disk sensor system useful in the system of FIG. 3.

As part of the film loading operation, and prior to the thrusting of the film out of the cassette, motor 25 drives the spool of cassette 14 in a reverse, i.e. rewind, direction to rotate the data disk at a relatively stable rotational speed for reading of the bar coded information thereon. This information is then loaded into non-volatile memory in microprocessor 29 for subsequent use in setting up and controlling the camera during picture taking operations. For this purpose, an opto-sensor 32 is mounted at the lower end of the cassette receiving chamber to align with opening 31 in the cassette end cap to allow optical access to the data disk 30 when the cassette is inserted into the camera. The opto-sensor is coupled via variable gain control circuit 33 to a data input of microprocessor 29. A control output from the microprocessor is coupled to gain control circuit 33 to control the opto-sensor gain. An example of an opto-sensor gain control circuit is shown in FIG. 4 wherein resistors 36 are selectively coupled under the control of microprocessor 29 to a photodetector 35 in opto-sensor 32 to provide varying loads and consequent operating points for the photodetector. It will be appreciated that opto-sensor gain can alternatively be changed by varying the drive of the light source conventionally used in an opto-sensor.

In accordance with the invention, there is provided a simple but highly effective method of detecting noisy, corrupted sensor output signals by adjusting the sensor gain or sensitivity to increase integrity of the detected signal. The method combines knowledge of the data disk pattern with controlling the gain of the opto-sensor used in reading, i.e. sensing, the bar code elements on the data disk. Considering the data disk illustrated in FIG. 2, certain key features of the architecture of the disk can be noted. First, the quiet zone, QZ, must occur within a reasonable time after rotation is started. Second, a fixed number of wide and narrow data elements (thirteen for the illustrated disk) must be collected for a single rotation. Data elements are discriminated from the quiet zone by the relative times between transitions of the signal through a logic threshold level. Third, upon finding the requisite number of data elements, the fourteenth element (in the illustrated example) must the quiet zone again. This required information for a proper read provides enough knowledge to be able to sense a corrupted waveform and make compensating adjustments to the sensor system gain until the signal is read properly. Any noise in the system will manifest itself by the data not meeting the standard data format to be obtained normally from the data disk. Once the sensor gain setting is properly set, the signal can then be decoded in microprocessor 29.

Figure 5A:
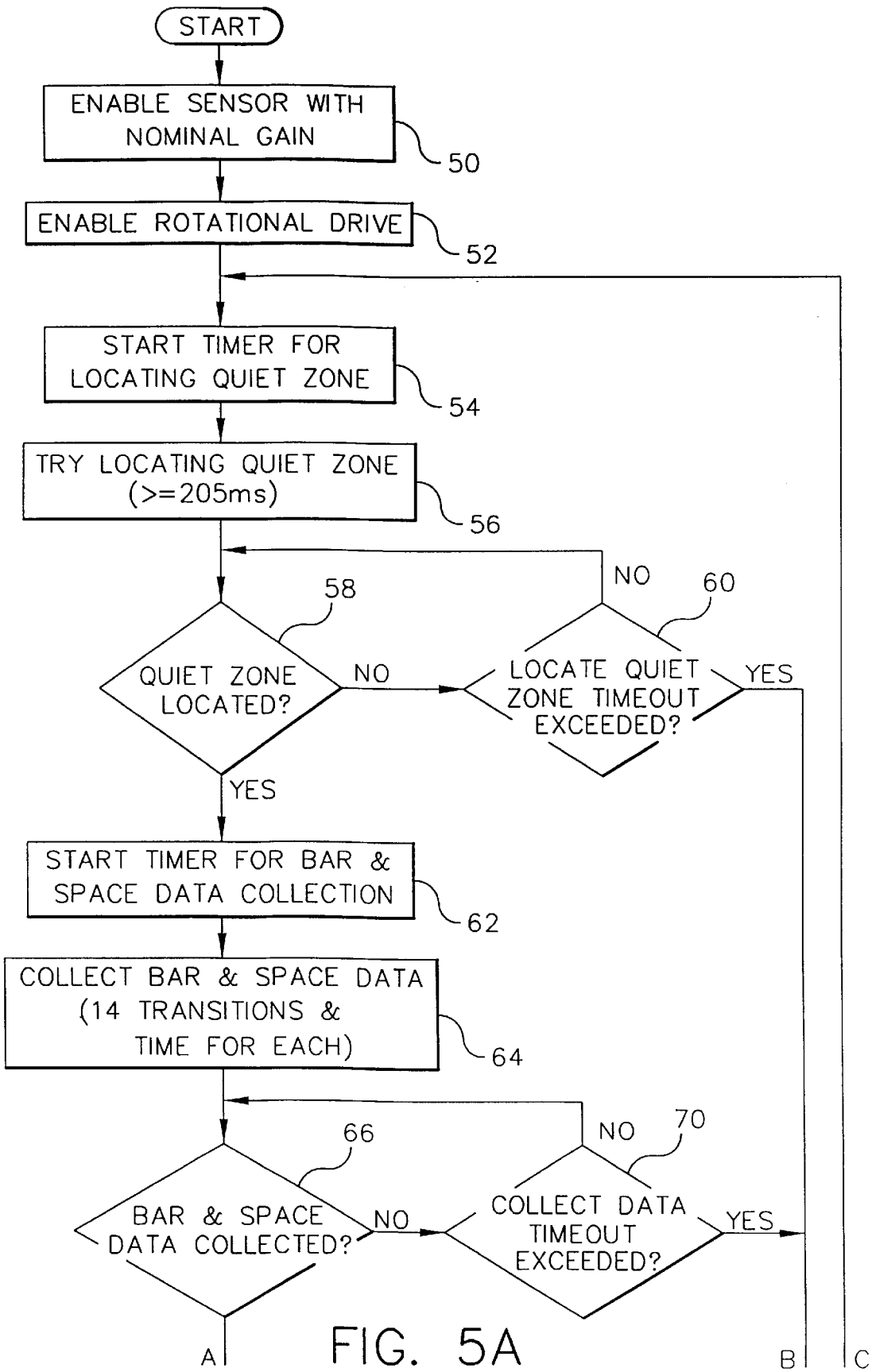
FIG. 5A–5B is a program flow chart for a camera microprocessor program for the data disk read system of FIG. 3 operating in accordance with the present invention.
Figure 5B:
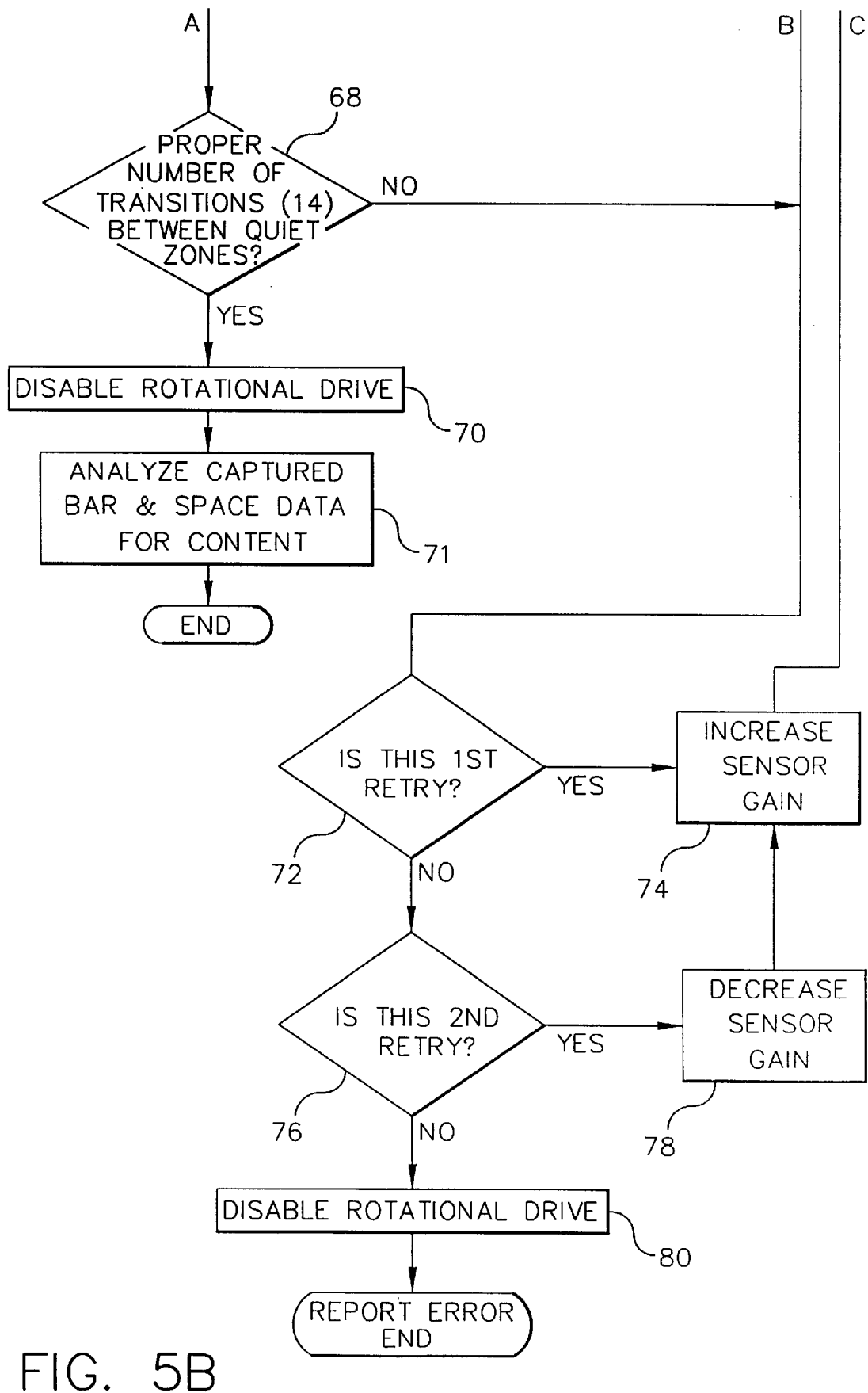
Figure 6:
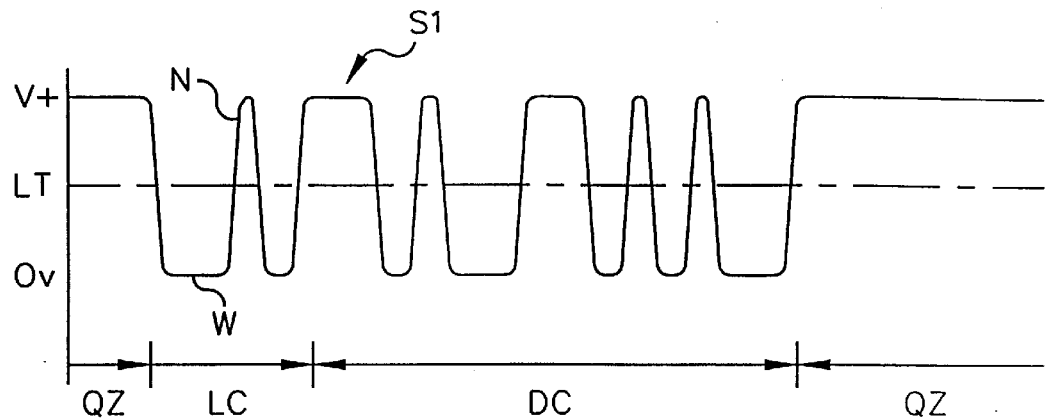
FIG. 6 is a an opto-sensor output signal waveform useful in explaining the present invention.

Referring now to FIGS. 5A and 5B, the manner in which the microprocessor 29 may be programmed to operate in accordance with the present invention will now be considered. After inserting a cassette into the camera 10 and closing door 11a, the data disk opto-sensor 32 is activated at step 50 and motor 25 is activated at step 52 to begin rotation of the data disk 30 in the reverse or rewinding direction. A timer operation is initiated at step 54 to begin looking for the quiet zone at step 56. FIG. 6 shows a normal, uncorrupted opto-sensor output signal S1 for a cassette that has a clean data disk and is properly seated in the receiving chamber. In this case, the camera is operating with the gain of the opto-sensor at the nominal setting determined during factory calibration. A high level at V+ corresponds to dark elements on the disk and a low level at 0 v corresponds to light or highly reflective elements on the disk. Each time the sensor signal S1 has transition through an intermediate logic threshold LT, the timer in the microprocessor is restarted and the time is accumulated until the timer is restarted at the next transition. If step 58 determines that the accumulated time is less than a minimum value, e.g. 205 ms, which reliably discriminates between the quiet zone QZ and a wide data element W, the process recycles through decision step 60 until the quiet zone is located or else a quiet zone timeout period is exceeded. For the normal sensor output signal of FIG. 6, the quiet zone is located during the first rotation and step 62 starts a timer and transition counting operation for each of the bar and space elements. Step 64 accumulates the transition count as well as the time between transitions for each of the bar and space elements. When steps 66 and 68 determine that the proper number of bar and space data elements have been sensed, motor 25 is disabled and microprocessor 29 analyzes the captured bar and space data for the film data represented thereby prior to moving to the film loading routine which restarts the motor in the unwinding direction to thrust the film out of the cassette into the camera proper as described above.

Figure 7A:
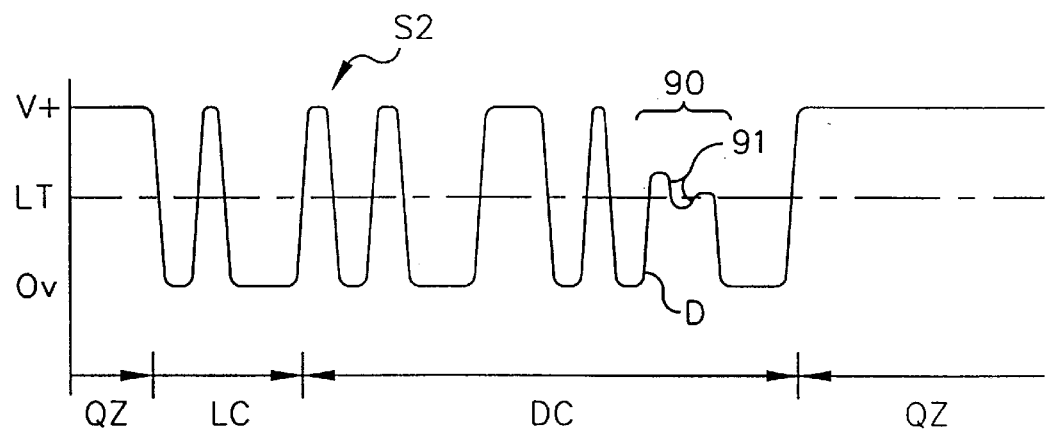
FIG. 7A–7B show signal waveforms similar to that of FIG. 6.
Figure 7B:
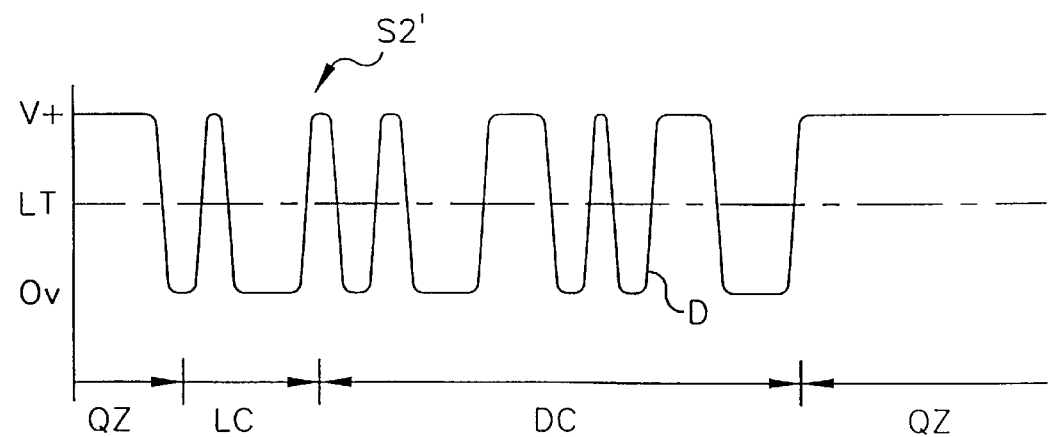

If, for any of the previously described reasons, a noisy, corrupted signal is produced, three possible error conditions can exist. The quiet zone may not be detectable (step 60), the bar and space data may not be detectable (step 70) or an incorrect number of bar and space elements may be detected (step 68). In any one of these events, the program branches to step 72 to initiate a retry subroutine to change the opto-sensor gain settings to one or more different settings prior to recycling back through the quiet zone and data element sensing steps. FIG. 7A shows an example of an opto-sensor signal S2 derived from a data disk having one of its dark elements damaged, by a scratch or otherwise, that causes a higher than normal reflection from the dark element. The result is that corresponding element signal D is truncated at 90 which creates additional transitions 91 through the logic threshold LT. In this example, step 68 determines that the number of transitions exceeds the normal count of 14 between successive quiet zones and branches to step 72. Step 72 determines that this is the first retry, and moves to step 74 which causes the opto-sensor gain to be increased by a predetermined amount. The magnitude of the gain change is determined empirically for a specific camera design such that proper corrective action is achieved in most cases of typical signal corruption. In an actual camera design, a gain change of about 8% from the nominal calibration value proved to be highly effective in correcting the data disk read signal. The program then returns to step 54 to again attempt to detect the quiet zone and data elements. The changed gain setting results in a signal S2' shown in FIG. 7B in which the truncation of element signal D has been virtually eliminated. As a result, the program now proceeds to steps 70 and 71 following which the microprocessor initiates normal loading of the film into the camera.

Figure 8A:
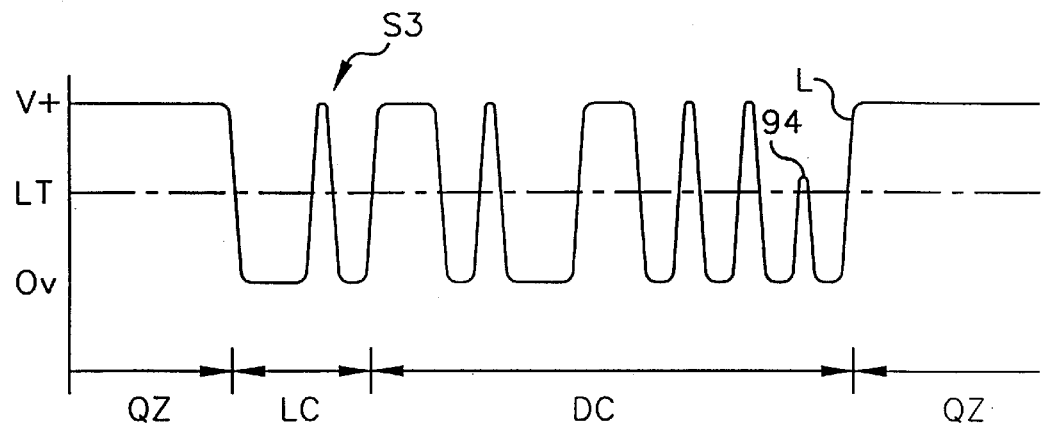
FIG. 8A–8C show signal additional waveforms similar to that of FIG. 6.
Figure 8B:
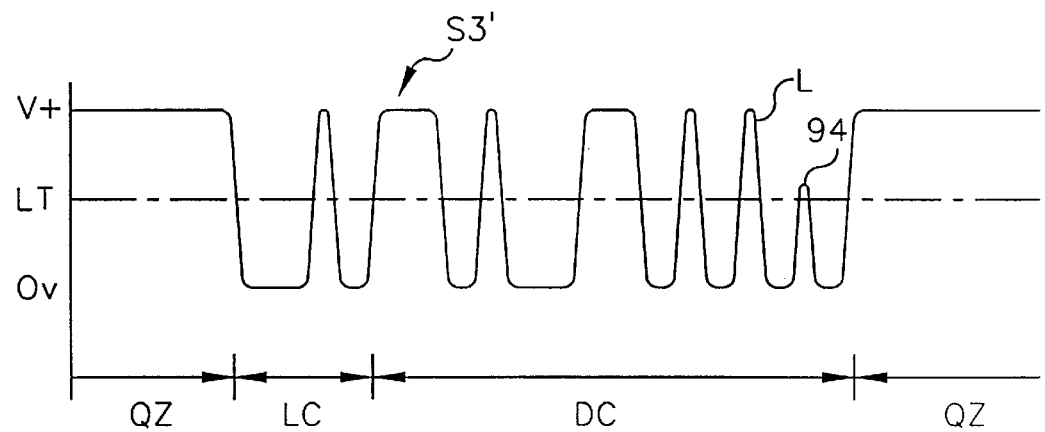
Figure 8C:
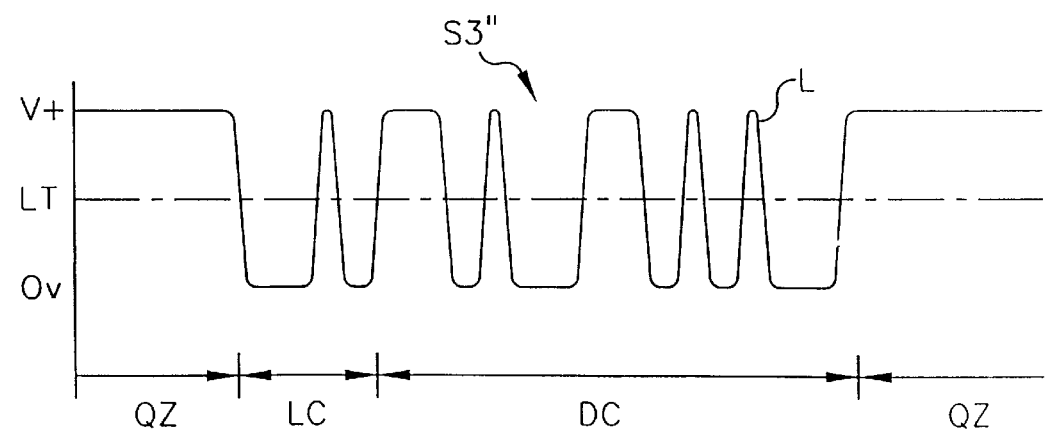

FIG. 8A shows a sensor output signal from a data disk in which a light (i.e. highly reflective) data element has been damaged, for example, by a scratch which produces a positive going spike 94 in the element signal L resulting in additional transitions through the logic threshold LT. During the first attempt to read the signal, step 68 moves the program to steps 72 and 74 to increase the sensor gain. The result as shown by signal S3' in FIG. 8B is that the spike amplitude is increased and the additional logic threshold transitions remain. On the second pass through the program, step 76 determines that this is the second retry and moves to step 78 to decrease the sensor gain below the nominal setting, preferably by the same magnitude as the increase previously applied at step 74. As shown in the signal S3' of FIG. 8C, the decreased gain setting eliminates the spike from element signal L thereby causing the program to correctly read the data on the disk during the second retry, following which normal film loading is initiated.

It has been found, in actual tests, that the use of two retries with single increased and decreased gain setting for each try is adequate to obtain correct reading of the data disk in the presence of signal noise conditions described above. It will be appreciated, however, that additional retries with other gain settings may be employed. Also, the sequence of the gain settings is a matter of design choice. Thus, the invention has been described with reference to a preferred embodiment and it is apparent that variations and modifications can be effected by a person of ordinary skill in the art without departing from the scope of the invention.

PARTS LIST 10 camera
11 camera body
11a hinged cassette loading door
12 cassette receiving chamber
14 film cassette
15 film
16 exposure frame
18 film takeup spool
19 film takeup chamber
25 film drive motor
26 motor drive circuit
29 microprocessor
30 data disk
31 end cap window
32 opto-sensor
33 variable gain control circuit
35 photodetector
36 photodetector load resistors
QZ quiet zone
DC data code section
LC length code section

What is claimed is:

1. A method of setting gain of a radial bar code opto-sensor in a photographic camera, the radial bar code being on a rotatable data disk mounted in a film cassette inserted into the camera and comprising an extended reference segment and a data segment, the data segment having a fixed number of variable width bar code data elements, the method comprising the steps of:

initiating rotation of the data disk in the camera;

activating the opto-sensor at a first gain setting to generate an output signal representing transitions between the bar code data elements in the data segment;

counting the number of transitions detected in the data segment; and, if the transition count is other than a count corresponding to the fixed number of bar code data elements, adjusting the opto-sensor gain one or more times to other gain settings and counting the transitions at each gain setting until the transition count corresponds to the fixed number of bar code data elements.

2. The method of claim 1 wherein the opto-sensor gain settings are adjusted above and below the first gain setting.

3. The method of claim 2 wherein the opto-sensor gain settings are adjusted be equal magnitude changes above and below the first gain setting.

4. Apparatus for setting gain of a radial bar code opto-sensor in a photographic camera, the radial bar code being on a rotatable data disk mounted in a film cassette inserted into the camera and comprising an extended reference segment and a data segment, the data segment having a fixed number of variable width bar code data elements, the method comprising the steps of:

means for initiating rotation of the data disk in the camera;

a variable gain opto-sensor circuit operative during rotation of the data disk for generating a sensor output signal having transitions through a logic threshold normally representative of transitions between data elements on the data disk;

processor means for establishing a first gain setting and selectable other gain settings at the opto-sensor circuit during generation of the sensor output signal, and for counting logic threshold transitions in the output signal such that:

if the transition count for said first gain setting is other than a count corresponding to said fixed number of bar code data elements, then adjusting the opto-sensor gain to one or more of said selectable other gain settings until the transition count corresponds to the fixed number of bar code data elements.

5. The apparatus of claim 4 wherein said selectable other gain settings comprise gain changes respectively above and below said first gain setting.

6. The apparatus of claim 4 wherein said selectable other gain setting comprise gain changes of equal magnitude above and below said first gain setting.

7. A photographic film camera comprising:

a cassette receiving chamber for receiving a film cassette having a rotatable radial bar code data disk mounted at one end thereof;

means for rotating the data disk after insertion of the cassette in the receiving chamber;

a variable gain opto-sensor circuit responsive to the radial bar code for generating a sensor output signal having transitions through a logic threshold normally representative of transitions between data elements on the data disk;

and processor means for establishing a first gain setting and selectable other gain settings at the opto-sensor circuit during generation of the sensor output signal, and for counting logic threshold transitions in the output signal such that:

if the transition count for said first gain setting is other than a count corresponding to said fixed number of bar code data elements, then adjusting the opto-sensor gain to one or more of said selectable other gain settings until the transition count corresponds to the fixed number of bar code data elements; and when said transition count corresponds to the fixed number of bar code data elements, initiating a film loading operation whereby film is loaded into the camera.

8. The camera of claim 7 wherein said selectable other gain settings are respectively above and below said first gain setting.

9. The camera of claim 7 wherein said selectable other gain settings are respectively of equal magnitude above and below said first gain setting.

* * * * *